United States Patent
Kraisuwannasarn

(10) Patent No.: US 9,402,416 B2
(45) Date of Patent: Aug. 2, 2016

(54) DETECTION SYSTEM

(71) Applicant: ESSENTRA FILTER PRODUCTS DEVELOPMENT CO. PTE. LTD, Novena Square (SG)

(72) Inventor: Chaiyot Kraisuwannasarn, Bangkok (TH)

(73) Assignee: ESSENTRA FILTER PRODUCTS DEVELOPMENT CO. PTE. LTD., Singapore (SG)

( * ) Notice: Subject to any disclaimer, the term of this patent is extended or adjusted under 35 U.S.C. 154(b) by 0 days.

(21) Appl. No.: 14/437,390

(22) PCT Filed: Oct. 10, 2013

(86) PCT No.: PCT/EP2013/071219
§ 371 (c)(1),
(2) Date: Apr. 21, 2015

(87) PCT Pub. No.: WO2014/063928
PCT Pub. Date: May 1, 2014

(65) Prior Publication Data
US 2015/0272204 A1    Oct. 1, 2015

(30) Foreign Application Priority Data

Oct. 23, 2012 (GB) .................... 1219061.7
Jul. 29, 2013 (GB) .................... 1313507.4

(51) Int. Cl.
G06K 9/00    (2006.01)
A24C 5/34    (2006.01)
A24D 3/02    (2006.01)
G06T 7/00    (2006.01)

(52) U.S. Cl.
CPC ............ *A24C 5/3412* (2013.01); *A24D 3/0295* (2013.01); *G06T 7/001* (2013.01); *G06T 2207/10004* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 4,865,052 A | * | 9/1989 | Hartmann | A42C 5/1871 131/280 |
| 2010/0059074 A1 | * | 3/2010 | Brantley | A24D 3/0295 131/280 |
| 2013/0002853 A1 | | 1/2013 | Okuyama | |
| 2013/0123085 A1 | * | 5/2013 | Hoffmann | A24D 3/0295 493/4 |

FOREIGN PATENT DOCUMENTS

| | | |
|---|---|---|
| DE | 44 24 045 A1 | 1/1996 |
| DE | 10 2009 058 040 A1 | 6/2011 |
| DE | 20 2012 007 467 U1 | 10/2012 |

(Continued)

OTHER PUBLICATIONS

Form PCT/ISA/210 issued in PCT/EP2013/071219 with a mailing date of Feb. 28, 2014 (6 pages).

(Continued)

*Primary Examiner* — Daniel Mariam
(74) *Attorney, Agent, or Firm* — Flynn, Thiel, Boutell & Tanis, P.C.

(57) ABSTRACT

A method for assessing the acceptability of product filter rods, filters or filter elements which include a longitudinally extending core of filtering material including a longitudinal channel extending from an end of the core.

22 Claims, 8 Drawing Sheets

(56) References Cited

FOREIGN PATENT DOCUMENTS

| | | |
|---|---|---|
| EP | 2 505 994 A1 | 10/2012 |
| GB | 2 091 078 A | 7/1982 |
| JP | 2001-292757 A | 10/2001 |
| WO | WO 2010/028354 A1 | 3/2010 |
| WO | WO 2011/117984 A1 | 9/2011 |
| WO | WO 2012/117499 A1 | 9/2012 |
| WO | WO 2013/046401 A1 | 4/2013 |
| WO | WO 2013/046402 A1 | 4/2013 |

OTHER PUBLICATIONS

Form PCT/ISA/220 issued in PCT/EP2013/071219 with a mailing date of Feb. 28, 2014 (1 page).

Form PCT/ISA/237 issued in PCT/EP2013/071219 with a mailing date of Feb. 28, 2014 (6 pages).

\* cited by examiner

Standard sample
e.g. circle 2 different
center line

Inside & outside
distortion circle

Mix shape

Inside hairy

Contamination

Deformed
shape

DETECTION SYSTEM

FIELD OF THE INVENTION

The present invention relates to a system for assessing the quality and acceptability of product filters or filter elements, for example as part of a filter manufacturing process.

BACKGROUND OF THE INVENTION

The manufacture of cigarette filters, or related products, that have a tubular structure is well-known in the art. These typically rely on the thermoforming of a plasticised tow of cellulose acetate around a shaped die to form a continuous tube, which is then cut into finite lengths. Other variants are known in which the fibre tow is formed around a moving mandrel to form a void within the filter material; the material can then be cut in the void region to create a filter tip which is in the shape of a tube at the mouth end but is closed at the other end. The above methods may be used to form cigarette filters and filter elements that have an internal channel or bore (or a number of smaller channels or bores) extending from, and exposed at, the mouth end. The internal channel or bore may be circular in cross section, or may have a cross section of another defined shape (e.g. triangular, star-shaped, heart-shaped, etc.). The cross section of the channel is immediately visible at the mouth end and presents a distinctive image to the smoker, and therefore the monitoring and control of the visual appearance provided by the channel is highly important. The cross section of the channel can become distorted, ill-formed or ill-defined (e.g. loose fibres can give a 'hairy' end appearance to the channel), and it is vital that product filters/element with such misshapen channels do not find their way to the customer, and also that production is stopped so any fault in production (which is leading to misshapen product) may be quickly rectified.

To date, there is not a simple automated technique available to monitor the visual properties of the end of tubular shaped filters. Instead, visual quality checks would be routinely carried out by trained personnel after filter production. Clearly, this is time-consuming, expensive and open to interpretation, depending on the operator concerned. Further, if the fault is common to a large number of product filters, it may be due to a problem in the manufacturing process; monitoring product quality after the production run does not allow for halting production if there is a problem with the process. There is thus a need for a visual inspection system for the ends of tubular, shaped and other filters that is rapid, accurate and reliable, and which can easily be integrated "in line", as part of a high speed filter production process. Although vision systems are known and used for monitoring quality parameters of cigarette filters, none of these are able to quantify the visual characteristics of the ends of tubular, and related, filters.

SUMMARY OF THE INVENTION

According to the present invention there is provided a system (an in line system) for assessing the acceptability of product filter rods, filters or filter elements which comprise a longitudinally extending (e.g. substantially cylindrical, substantially annular) core of filtering material including (e.g. defining) a longitudinal channel (e.g. a bore) extending from an end of the core;
the system comprising:
(a) means (e.g. a flow advancer) for advancing a flow of product filter rods, filters or filter elements such that each filter rod/filter/element in the flow is oriented with the end (of the filter rod, filter or filter element) from which the longitudinal channel (bore) extends exposed (e.g. facing outwards from the flow);
(b) means (e.g. an image capture apparatus e.g. a camera) for capturing an image of an exposed end of a filter rod, filter or filter element in the advancing flow; and
(c) means (e.g. an analysis unit, e.g. a microcomputer) which determines from the image of the exposed end of the filter rod, filter or filter element a value for one or more of:
  (i) the cross sectional area of the longitudinal channel (bore) at the exposed end (of the filter rod, filter or filter element);
  (ii) the amount of (e.g. filtering) material detectable within the (e.g. cross sectional area) of the longitudinal channel (bore) at the exposed end (of the filter rod, filter or filter element);
  (iii) the outer perimeter of the longitudinal channel (bore) at the exposed end (of the filter rod, filter or filter element);
  (iv) the position of the longitudinal channel (bore) in the exposed end (of the filter rod, filter or filter element);
  (v) the outer perimeter of the core;
  (vi) the amount of (e.g. filtering) material detectable outside the outer perimeter of the core at the exposed end (of the filter rod, filter or filter element);
  (vii) the amount of impurity visible in the filtering material at the exposed end (of the filter rod, filter or filter element);
  (viii) the shape of the cross section of the longitudinal channel (bore) at the exposed end (of the filter rod, filter or filter element); and
  (ix) the area of the exposed end (of the filter rod, filter or filter element) having a specific colour or pigment;
and compares the (or each) determined value (for the parameter) with a predetermined value (for that parameter) to thereby assess whether the filter rod, filter or filter element is acceptable. Herein, the term "acceptable" means of sufficiently high quality; in other words acceptable means not defective.

According to the present invention there is provided a system (an in line system) for assessing the acceptability of product filter rods, filters or filter elements which comprise a longitudinally extending (e.g. substantially cylindrical, substantially annular) core of filtering material including (e.g. defining) a longitudinal channel (e.g. a bore) extending from an end of the core;
the system comprising:
(a) means (e.g. a flow advancer) for advancing a flow of product filter rods, filters or filter elements such that each filter rod/filter/element in the flow is oriented with the end (of the filter rod, filter or filter element) from which the longitudinal channel (bore) extends exposed (e.g. facing outwards from the flow);
(b) means (e.g. an image capture apparatus e.g. a camera) for capturing an image of an exposed end of a filter rod, filter or filter element in the advancing flow;
(c) means (e.g. an analysis unit) for comparing the captured image with an image (e.g. a stored image) of a standard (e.g. acceptable) rod, filter or filter element;
(d) means (e.g. an analysis unit) which determines, from the differences between the captured image and the image of the standard rod, filter or filter element, a value for one or more of:
  (i) the cross sectional area of the longitudinal channel (bore) at the exposed end (of the filter rod, filter or filter element);
  (ii) the amount of (e.g. filtering) material detectable within the (e.g. cross sectional area) of the longitudinal channel (bore) at the exposed end (of the filter rod, filter or filter element);

(iii) the outer perimeter of the longitudinal channel (bore) at the exposed end (of the filter rod, filter or filter element);

(iv) the position of the longitudinal channel (bore) in the exposed end (of the filter rod, filter or filter element);

(v) the outer perimeter of the core;

(vi) the amount of (e.g. filtering) material detectable outside the outer perimeter of the core at the exposed end (of the filter rod, filter or filter element);

(vii) the amount of impurity visible in the filtering material at the exposed end (of the filter rod, filter or filter element);

(viii) the shape of the cross section of the longitudinal channel (bore) at the exposed end (of the filter rod, filter or filter element);

(ix) the area of the exposed end (of the filter rod, filter or filter element) having a specific colour or pigment;

(x) the diameter of the exposed end (of the filter rod, filter or filter element); and (xi) the diameter of the longitudinal channel (bore) in the exposed end (of the filter rod, filter or filter element);

and compares the (or each) determined value (for the parameter) with a predetermined value (for that parameter) to thereby assess whether the filter rod, filter or filter element is acceptable.

The means for capturing the image (of the exposed end of a filter rod, filter or filter element in the advancing flow) may capture the image over a period of 5 to 35 milliseconds (ms). In some examples, the means for capturing the image (of the exposed end of a filter rod, filter or filter element in the advancing flow) may capture the image over a period of 5 to 15 ms, for example 10 to 12 ms, for example 11 ms. In some examples, the means for capturing the image (of the exposed end of a filter rod, filter or filter element in the advancing flow) may be a Keyence CV-H035M digital camera with a CA-LH16 (low distortion) lens, available from Keyence (GB).

The means (c) and/or (d) may compare the determined value with a predetermined value and thereby assess whether the rod, filter or element is acceptable within 90 milliseconds (ms) of commencement of step (b), capturing the image. The means (c) and/or (d) may compare the determined value with a predetermined value and thereby assess whether the rod, filter or element is acceptable within 40 milliseconds (ms), for example 36 ms, of commencement of step (b), capturing the image.

The means (c) and/or (d) may determine, from the differences between the captured image and the image of the standard rod, filter or filter element, a value for one or more (for example all) of:

(ii) the amount of (e.g. filtering) material detectable within the (e.g. cross sectional area) of the longitudinal channel (bore) at the exposed end (of the filter rod, filter or filter element);

(iv) the position of the longitudinal channel (bore) in the exposed end (of the filter rod, filter or filter element);

(vii) the amount of impurity visible in the filtering material at the exposed end (of the filter rod, filter or filter element); and (xi) the diameter of the longitudinal channel (bore) in the exposed end (of the filter rod, filter or filter element);

and compare the (or each, or all) determined value(s) (for the parameter) with a predetermined value (for that parameter) and thereby assess whether the rod, filter or element is acceptable within 40 milliseconds (ms), for example 36 ms, of commencement of step (b), capturing the image.

Preferably, the means (d) analyses portions (e.g. pixels) of the captured image which are different when the captured image is compared to the (e.g. stored) image of the standard rod, filter or filter element, and determines value(s) based (e.g. exclusively) on portions (e.g. pixels) which are different when the two images are compared.

Preferably, the means (d) determines values for two or more of the parameters simultaneously.

Prior art systems may capture an image of a product (filter rod, filter etc.) and compare pixels which depict the product with pixels which depict the background. Thus, all pixels are analysed in calculating dimensions, circumferences, etc., which are subsequently used to check whether the filter is circular, and then whether the bore is circular, and then whether the bore is centrally located etc., and ultimately whether the product is satisfactory. The system of the invention compares the captured image with an (e.g. stored) image of the standard rod, filter or filter element, and determines value(s) for the parameter(s) based (e.g. only) on portions (e.g. pixels) of the images which are different when the two images are compared; thus, the determination of the relevant parameter is based on analysis of a limited portion of the captured image (limited number of pixels) and is much quicker than the prior art systems. Further, the system may determine the relevant parameters (based on differences in the images) simultaneously. These differences with the prior art mean that the applicants system may be used to analyse products at very high speed (e.g. product rods being made at speeds of 500 m/min).

The system may further comprise signalling means (an alarm e.g. an audio and/or visual alarm) for signalling if the filter rod, filter or filter element is not acceptable.

The system may further comprise a light source e.g. focussed on the exposed end of a filter rod, filter or filter element in the advancing flow. The light source may be an LED. The light source/LED may be equipped with a flash function. LED light sources are preferable because they provide a very stable/constant intensity, even when used with flash function. It will be appreciated that a stable intensity/brightness is important; if an image is, for example, too dark then an otherwise acceptable filter may appear dirty (e.g. contaminated with impurity). The light source may be oriented at an angle of 90 degrees to the exposed end of a filter rod, filter or filter element in the advancing flow (so it shines directly onto the exposed end). In another example, the light source may be oriented at an angle of 10 to 20 degrees, for example 15 degrees, to the exposed end of a filter rod, filter or filter element in the advancing flow. The applicants have found that illuminating the target (exposed end) at a low angle of e.g. 15 degrees reduces the amount of reflection/glare back to the camera, which may aid in capturing a clearer image. The analysis unit may be a computer [e.g. Controller CV-5501 with associated built in software available from Keyence (GB)].

Preferably the system further comprises means (an ejector system) for removing a filter rod, filter or filter element which is (assessed to be) not acceptable from the advancing flow. Preferably the system or means (ejector system) is accurate to one rod, filter or filter element. I.e. it is able to reject only the problematic rod by itself unlike previous detection systems that will reject 3 rods before and after the actual problematic rod. The applicants have found that their system/method/apparatus finds sample rods quickly and accurately and it is therefore possible to reject only the problematic (unsatisfactory) rod, which greatly reduces waste over the prior systems.

Preferably the system further comprises means for halting production of product filter rods, filters or filter elements in the event a predetermined proportion of product filter rods, filters or filter elements are (assessed to be) not acceptable.

The means (e.g. flow advancer) for advancing a flow of product filter rods, filters or filter elements such that each filter rod/filter/element in the flow is oriented with the end (of the filter rod, filter or filter element) from which the longitudinal channel (bore) extends exposed (e.g. facing outwards from the flow) may comprise a fluted wheel which includes a plurality of grooves or flutes in its perimeter, each of which are dimensioned to engage with a single product filter rod, filter or filter element. The grooves or flutes may include suction means to hold the single product filter rod, filter or filter element in place while the image capture apparatus captures the image of the exposed end of the filter rod, filter or filter element in the advancing flow. The fluted wheel may include means (an ejector) for ejecting the filter rod, filter or filter element from the advancing flow in the event the rod etc. is unacceptable. This may include means for removing the suction, and/or a blower, to thereby eject the filter rod, filter or filter element.

The analysis unit may determine a value for the position of the longitudinal channel in the exposed end of the filter rod, filter or filter element by: determining the centre point of the end of the filter rod, filter or filter element from which the longitudinal channel extends; determining the centre point of the longitudinal channel; and determining (a value for) the distance between these centre points. If the determined value for the distance between the two centre points is too large (above the predetermined value) this means the filter rod, filter or filter element is not acceptable (e.g. because the channel is "off centre"). The filter rod, filter or filter element may then be rejected. The determined value may be a specific pixel or pixels in the image (e.g. in the case of each centre point), or a number of pixels in the image (e.g. in the case of the distance between centre points). The pre-determined value may be a number of pixels (e.g. corresponding to a predetermined "acceptable" value for the distance in pixels between the two centre points).

The analysis unit may determine a value for the amount of (e.g. filtering) material detectable within the cross sectional area of the longitudinal channel at the exposed end of the filter rod, filter or filter element by determining the cross sectional area of the longitudinal channel and comparing this with a predetermined value. If the determined value is too small (below the predetermined value) this means the filter rod, filter or filter element is not acceptable (e.g. because something—e.g. a "hair" or strand of filtering material—is within the channel and/or because the channel is the wrong shape). The filter rod, filter or filter element may then be rejected. In an alternative example, the analysis unit may determine a value for the amount of (e.g. filtering) material detectable within the cross sectional area of the longitudinal channel at the exposed end of the filter rod, filter or filter element and compare this with a predetermined value. If the determined value is too large (above the predetermined value) this means the filter rod, filter or filter element is not acceptable (e.g. because something—e.g. a "hair" or strand of filtering material—is within the channel and/or because the channel is the wrong shape). The determined value may be a number of pixels in the image (e.g. in the case of an area, or the number of pixels which correspond to (e.g. filtering) material detectable in a specific area). The pre-determined value may be a number of pixels (e.g. corresponding to a predetermined "acceptable" value for the number of pixels which correspond to (e.g. filtering) material detectable in a specific area).

The analysis unit may determine a value for the amount of impurity visible in the filtering material at the exposed end (of the filter rod, filter or filter element) and compare this with a predetermined value. If the determined value is too large (above the predetermined value) this means the filter rod, filter or filter element is not acceptable (e.g. because an impurity such as a dust fragment is visible at the exposed end). The determined value may be a number of pixels in the image (e.g. in the case of the number of pixels which correspond to locations where impurity is detected in a specific area). The pre-determined value may be a number of pixels (e.g. corresponding to a predetermined "acceptable" value for the number of pixels which correspond to locations where impurity is detected in a specific area).

The system may include means for advancing a flow of product filter rods, filters or filter elements such that each filter rod/filter/element in the flow is oriented with both ends (of the filter rod, filter or filter element) from which the longitudinal channel (bore) extends exposed (e.g. facing outwards from the flow);
and means for capturing (e.g. with one or more image capture apparatuses) images of both exposed ends of a filter rod, filter or filter element in the advancing flow. It will be appreciated that the system then analyses the images of both exposed ends. This system may be particularly useful assessing acceptability of continuous tubes (where the bore runs the full length of the product rod, filter or filter element).

According to the present invention in another aspect there is provided a machine for production of filter rods, filters or filter elements [e.g. which comprise a longitudinally extending (e.g. substantially cylindrical, substantially annular) core of filtering material including (e.g. defining) a longitudinal channel (e.g. a bore) extending from an end of the core], the machine comprising a system as described and defined herein.

According to the present invention there is provided a method (an in line method) for assessing the acceptability of product filter rods, filters or filter elements which comprise a longitudinally extending (e.g. substantially cylindrical, substantially annular) core of filtering material including (e.g. defining) a longitudinal channel (e.g. a bore) extending from an end of the core;
the method comprising the steps of:
(a) advancing a flow of product filter rods, filters or filter elements such that each filter rod/filter/element in the flow is oriented with the end (of the filter rod, filter or filter element) from which the longitudinal channel (bore) extends exposed (e.g. facing outwards from the flow);
(b) capturing (e.g. with an image capture apparatus) an image of an exposed end of a filter rod, filter or filter element in the advancing flow;
(c) determining (e.g. using an analysis unit) from the image of the exposed end of the filter rod, filter or filter element a value for one or more of:
(i) the cross sectional area of the longitudinal channel (bore) at the exposed end (of the filter rod, filter or filter element);
(ii) the amount of (e.g. filtering) material detectable within the (e.g. cross sectional area) of the longitudinal channel (bore) at the exposed end (of the filter rod, filter or filter element);
(iii) the outer perimeter of the longitudinal channel (bore) at the exposed end (of the filter rod, filter or filter element);
(iv) the position of the longitudinal channel (bore) in the exposed end (of the filter rod, filter or filter element);
(v) the outer perimeter of the core;
(vi) the amount of (e.g. filtering) material detectable outside the outer perimeter of the core at the exposed end (of the filter rod, filter or filter element); and
(vii) the amount of impurity visible in the filtering material at the exposed end (of the filter rod, filter or filter element);

(viii) the shape of the cross section of the longitudinal channel (bore) at the exposed end (of the filter rod, filter or filter element); and (ix) the area of the exposed end (of the filter rod, filter or filter element) having a specific colour or pigment;

(d) comparing the (or each) determined value (for the parameter) with a predetermined value (for that parameter) to thereby assess whether the filter rod, filter or filter element is acceptable.

The image (of the exposed end of a filter rod, filter or filter element in the advancing flow) may be captured over a period of 5 to 35 milliseconds (ms). In some examples, the image (of the exposed end of a filter rod, filter or filter element in the advancing flow) may be captured over a period of 5 to 15 ms, for example 10 to 12 ms, for example 11 ms.

In some methods of the invention, the steps of (c) determining and (d) comparing the determined value with a predetermined value to thereby assess whether the rod, filter or element is acceptable may be completed within 90 milliseconds (ms) of commencement of step (b), capturing the image. In some methods of the invention, the steps of (c) determining and (d) comparing the determined value with a predetermined value to thereby assess whether the rod, filter or element is acceptable may be completed within 40 milliseconds (ms), for example 36 ms, of commencement of step (b), capturing the image.

The steps (c) and (d) may determine, from the image of the exposed end of the filter rod, filter or filter element, a value for one or more of (for example all of):

(ii) the amount of (e.g. filtering) material detectable within the (e.g. cross sectional area) of the longitudinal channel (bore) at the exposed end (of the filter rod, filter or filter element);

(iv) the position of the longitudinal channel (bore) in the exposed end (of the filter rod, filter or filter element);

(vii) the amount of impurity visible in the filtering material at the exposed end (of the filter rod, filter or filter element); and (xi) the diameter of the longitudinal channel (bore) in the exposed end (of the filter rod, filter or filter element);
and compare the (or each, or all) determined value(s) (for the parameter) with a predetermined value (for that parameter) and thereby assess whether the rod, filter or element is acceptable within 40 milliseconds (ms), for example 36 ms, of commencement of step (b), capturing the image.

According to the present invention in a further aspect there is provided a method (an in line method) for assessing the acceptability of product filter rods, filters or filter elements which comprise a longitudinally extending (e.g. substantially cylindrical, substantially annular) core of filtering material including (e.g. defining) a longitudinal channel (e.g. a bore) extending from an end of the core;
the method comprising the steps of:
(a) advancing a flow of product filter rods, filters or filter elements such that each filter rod/filter/element in the flow is oriented with the end (of the filter rod, filter or filter element) from which the longitudinal channel (bore) extends exposed (e.g. facing outwards from the flow);
(b) capturing (e.g. with an image capture apparatus) an image of an exposed end of a filter rod, filter or filter element in the advancing flow;
(c) comparing (e.g. using an analysis unit) the captured image with an (e.g. stored) image of a standard (e.g. acceptable) rod, filter or filter element;
(d) determining (e.g. using an analysis unit), from the differences between the captured image and the (e.g. stored) image of the standard rod, filter or filter element, a value for one or more of the following parameters:

(i) the cross sectional area of the longitudinal channel (bore) at the exposed end (of the filter rod, filter or filter element);

(ii) the amount of (e.g. filtering) material detectable within the (e.g. cross sectional area) of the longitudinal channel (bore) at the exposed end (of the filter rod, filter or filter element);

(iii) the outer perimeter of the longitudinal channel (bore) at the exposed end (of the filter rod, filter or filter element);

(iv) the position of the longitudinal channel (bore) in the exposed end (of the filter rod, filter or filter element);

(v) the outer perimeter of the core;

(vi) the amount of (e.g. filtering) material detectable outside the outer perimeter of the core at the exposed end (of the filter rod, filter or filter element);

(vii) the amount of impurity visible in the filtering material at the exposed end (of the filter rod, filter or filter element);

(viii) the shape of the cross section of the longitudinal channel (bore) at the exposed end (of the filter rod, filter or filter element);

(ix) the area of the exposed end (of the filter rod, filter or filter element) having a specific colour or pigment;

(x) the diameter of the exposed end (of the filter rod, filter or filter element); and (xi) the diameter of the longitudinal channel (bore) in the exposed end (of the filter rod, filter or filter element);

(e) comparing the (or each) determined value (for the parameter) with a predetermined value (for that parameter) to thereby assess whether the filter rod, filter or filter element is acceptable.

The image (of the exposed end of a filter rod, filter or filter element in the advancing flow) may be captured over a period of 5 to 35 milliseconds (ms). In some examples, the image (of the exposed end of a filter rod, filter or filter element in the advancing flow) may be captured over a period of 5 to 15 ms, for example 10 to 12 ms, for example 11 ms.

In some methods of the invention, the steps of (c) comparing, (d) determining and (e) comparing the determined value with a predetermined value to thereby assess whether the rod, filter or element is acceptable may be completed within 90 milliseconds (ms) of commencement of step (b), capturing the image. In some methods of the invention, the steps of (c) comparing, (d) determining and (e) comparing the determined value with a predetermined value to thereby assess whether the rod, filter or element is acceptable may be completed within 40 milliseconds (ms), for example 36 ms, of commencement of step (b), capturing the image.

The steps (d) and (e) may determine, (e.g. using an analysis unit), from the differences between the captured image and the (e.g. stored) image of the standard rod, filter or filter element, a value for one or more of (for example all of) the following parameters:

(ii) the amount of (e.g. filtering) material detectable within the (e.g. cross sectional area) of the longitudinal channel (bore) at the exposed end (of the filter rod, filter or filter element);

(iv) the position of the longitudinal channel (bore) in the exposed end (of the filter rod, filter or filter element);

(vii) the amount of impurity visible in the filtering material at the exposed end (of the filter rod, filter or filter element); and (xi) the diameter of the longitudinal channel (bore) in the exposed end (of the filter rod, filter or filter element);
and compare the (or each, or all) determined value(s) (for the parameter) with a predetermined value (for that parameter)

and thereby assess whether the rod, filter or element is acceptable within 40 milliseconds (ms), for example 36 ms, of commencement of step (b), capturing the image.

Preferably, the method analyses portions (e.g. pixels) of the captured image which are different when the captured image is compared to the image of the standard rod, filter or filter element, and determines a value(s) for the parameter(s) based (e.g. exclusively) on portions (e.g. pixels) which are different when the two images are compared.

Preferably, the method determines value for two or more of the parameters simultaneously.

Prior art methods may capture an image of a product (filter rod, filter etc.) and compare pixels which depict the product with pixels which depict the background. Thus, all pixels are analysed when calculating dimensions, circumferences, etc., which are subsequently used to check whether the filter is circular, and then whether the bore is circular, and then whether the bore is centrally located etc., and ultimately whether the product is satisfactory. The method of the invention compares the captured image with a (e.g. stored) image of the standard rod, filter or filter element, and determines value(s) for the parameter(s) based (e.g. only) on portions (e.g. pixels) of the images which are different when the two images are compared; thus, the determination of the relevant parameter is based on analysis of a limited portion of the captured image (limited number of pixels) and is much quicker than the prior art processes. Further, the method may determine the relevant parameters (based on the image differences) simultaneously. These differences with the prior art mean that the applicants method may be used to analyse products at very high speed (e.g. product rods being made at speeds of 500 m/min).

The method may further comprise a step of signalling (with an alarm e.g. an audio and/or visual alarm) if the filter rod, filter or filter element is not acceptable.

The method may further comprise a step of removing a filter rod, filter or filter element which is (assessed to be) not acceptable from the advancing flow.

The method may further comprise a step of halting production of product filter rods, filters or filter elements in the event a predetermined proportion of product filter rods, filters or filter elements are (assessed to be) not acceptable.

The method may comprise a step of determining a value for the position of the longitudinal channel in the exposed end of the filter rod, filter or filter element by: determining the centre point of the end of the filter rod, filter or filter element from which the longitudinal channel extends; determining the centre point of the longitudinal channel; and determining (a value for) the distance between these centre points. If the determined value for the distance between the two centre points is too large (above the predetermined value) this means the filter rod, filter or filter element is not acceptable (e.g. because the channel is "off centre"). The filter rod, filter or filter element may then be rejected. The determined value may be a specific pixel or pixels in the image (e.g. in the case of each centre point), or a number of pixels in the image (e.g. in the case of the distance between centre points). The pre-determined value may be a number of pixels (e.g. corresponding to a predetermined "acceptable" value for the distance in pixels between the two centre points).

The method may comprise steps of determining a value for the amount of (e.g. filtering) material detectable within the cross sectional area of the longitudinal channel at the exposed end of the filter rod, filter or filter element by determining the cross sectional area of the longitudinal channel and comparing this with a predetermined value. If the determined value is too small (below the predetermined value) this means the filter rod, filter or filter element is not acceptable (e.g. because something—e.g. a "hair" or strand of filtering material—is within the channel and/or because the channel is the wrong shape). The filter rod, filter or filter element may then be rejected. In an alternative example, the method may comprise steps of determining a value of (e.g. filtering) material detectable within the cross sectional area of the longitudinal channel at the exposed end of the filter rod, filter or filter element and comparing this with a predetermined value. If the determined value is too large (above the predetermined value) this means the filter rod, filter or filter element is not acceptable (e.g. because something—e.g. a "hair" or strand of filtering material—is within the channel and/or because the channel is the wrong shape). The determined value may be a number of pixels in the image (e.g. in the case of an area, or the number of pixels which correspond to (e.g. filtering) material detectable in a specific area). The pre-determined value may be a number of pixels (e.g. corresponding to a predetermined "acceptable" value for the number of pixels which correspond to (e.g. filtering) material detectable in a specific area).

The method may comprise steps of determining a value for the amount of impurity visible in the filtering material at the exposed end (of the filter rod, filter or filter element) and comparing this with a predetermined value. If the determined value is too large (above the predetermined value) this means the filter rod, filter or filter element is not acceptable (e.g. because an impurity such as a dust fragment is visible at the exposed end). The determined value may be a number of pixels in the image (e.g. in the case of the number of pixels which correspond to locations where impurity is detected in a specific area). The pre-determined value may be a number of pixels (e.g. corresponding to a predetermined "acceptable" value for the number of pixels which correspond to locations where impurity detected in a specific area).

The method may include steps of (a) advancing a flow of product filter rods, filters or filter elements such that each filter rod/filter/element in the flow is oriented with both ends (of the filter rod, filter or filter element) from which the longitudinal channel (bore) extends exposed (e.g. facing outwards from the flow);

(b) capturing (e.g. with one or more image capture apparatuses) images of both exposed ends of a filter rod, filter or filter element in the advancing flow. It will be appreciated that the subsequent method steps are carried out with reference to the images of both exposed ends.

Herein, the term filter rod includes individual filters and individual filter elements, which are well known in the art. The term also includes double or higher multiple (usually quadruple or sextuple) length filters joined end to end; or double or higher multiple (usually quadruple or sextuple) length filter elements joined end to end, as are also well known.

The longitudinally extending core comprises a tobacco smoke filtering material. Preferably, the filtering material of the core is a (e.g. gathered and bonded) cellulose acetate tow, optionally including a plasticiser (e.g. glyceryl triacetate). Other fibrous or filamentary filtering materials may also be employed.

The longitudinally extending core may be substantially cylindrical (i.e. a cross section taken perpendicular to its longitudinal axis may have a substantially circular outer perimeter). The longitudinally extending core includes a longitudinal channel (e.g. a bore) extending from an end of the core. The core may include one or more channels. The (or each) longitudinally extending channel (bore) may have a cross section (taken perpendicular to its longitudinal axis) of any shape, although circular, triangular, star shaped, cog shaped or heart shaped cross sections are preferred. The longitudinally extending core is preferably engaged around the channel, although the longitudinally extending channel(s) may be at the perimeter of the core. The longitudinally extending core may comprise a substantially annular body.

BRIEF DESCRIPTION OF THE DRAWINGS

The present invention will now be illustrated with reference to the attached drawings in which.

DETAILED DESCRIPTION

Figure 1:
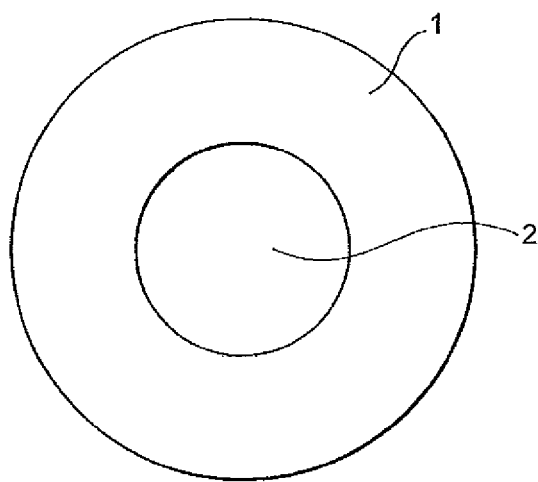
FIG. 1 is an end view of a tobacco smoke filter element.

FIG. 1 shows one end (the downstream or mouth end) of a filter element. The filter element comprises a thermoformed longitudinally extending core 1 of filtering material of substantially annular cross section. The longitudinally extending core 1 is made by thermoforming a plasticised cellulose acetate filamentary tow. The longitudinally extending (annular) core defines a longitudinal channel or bore 2 of circular cross section which extends from one end, to the other, of the core.

It will be appreciated that the filter element of FIG. 1 may be joined (abutted) at its upstream end to another filter element (not shown), and the abutted filter elements wrapped with plugwrap, to form a dual filter, as is well known in the art. A dual filter incorporating the filter element of FIG. 1 may be joined at its upstream end to a wrapped tobacco rod (not shown) by means of, for example, a full tipping overwrap which surrounds and engages the full length of the dual filter and the adjacent end only of the wrapped tobacco rod, to form a filter cigarette. Again, this is well known.

The filter element of FIG. 1 is made by thermoforming a longitudinally advancing flow of plasticised tow of cellulose acetate around a shaped die (of circular cross section) to form a continuous longitudinally advancing tube, by methods which are well known in the art, for example as in GB 2091078 and references therein. The continuously advancing thermoformed tube is then cut into finite length products (e.g. dual (or other multiple length) product rods comprising two (or other multiple) filter elements of FIG. 1 joined end to end). The dual product rods may be further processed into dual filters (e.g. using a filter maker) and filter cigarettes, by methods well known in the art.

As seen in FIG. 1, the cross section of the channel 2 is immediately visible at the mouth end of filter and is therefore visible at the mouth end of the ultimate product (dual filter or filter cigarette), and hence presents a distinctive image to the smoker (which may also be useful as an anti-counterfeiting measure). Monitoring and control of the visual appearance provided by the channel is therefore highly important. The present invention provides an in-line system and method for "quality control" of this appearance, as follows.

Figure 2:
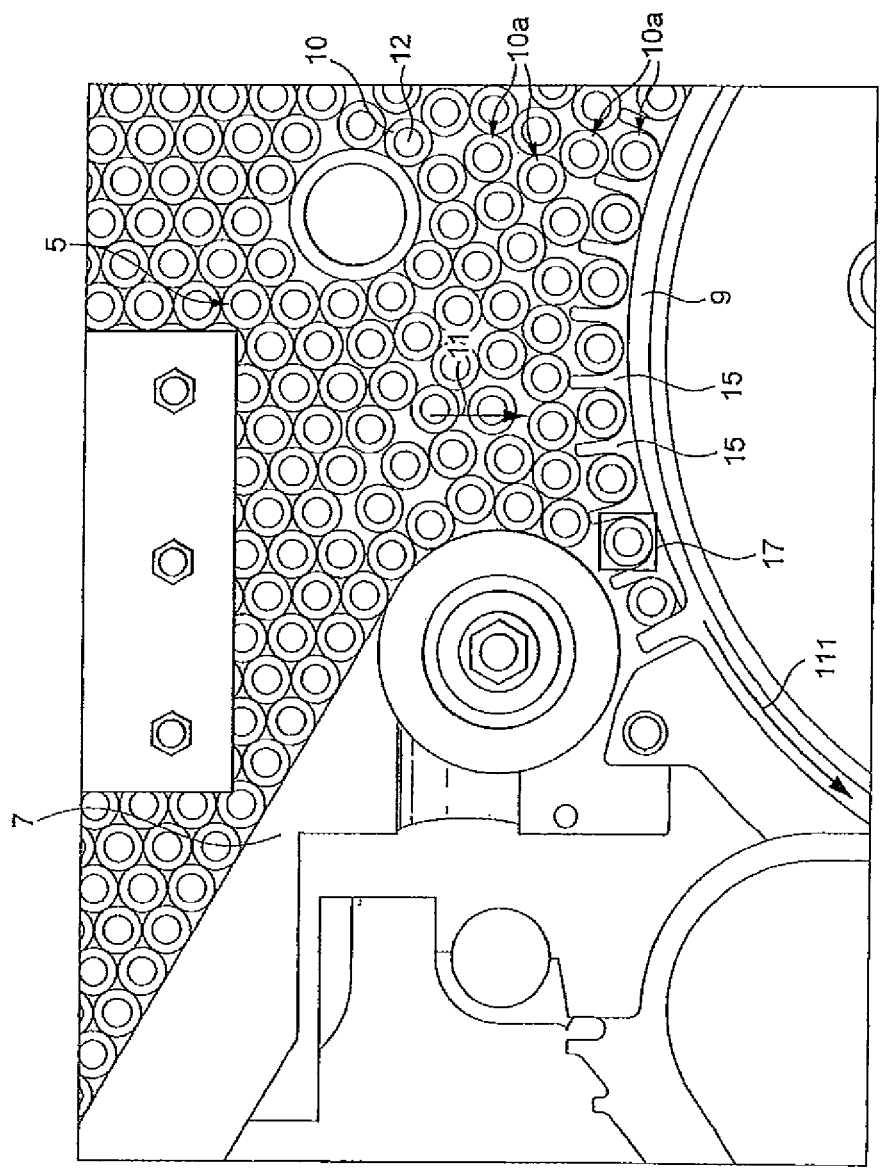
FIG. 2 is a side elevation view of a system according to one embodiment of the invention for assessing quality of filter elements such as those of FIG. 1 by a method which is an embodiment of the invention.

FIG. 2 shows a side elevation view of a system according to the invention for assessing quality of filters/filter elements such as those of FIG. 1. FIG. 2 shows a flow 5 of product filter rods 10a. Each product filter rod 10a comprises a longitudinally extending core of filtering material 10 which defines a longitudinal channel or bore 12 extending from an end of the core. Each rod 10a may be, for example, a dual product rod comprising two filter elements of FIG. 1, joined end to end. The flow of rods 10a travels generally downwards through a hopper 7 in the direction shown by arrow 11 towards a fluted drum 9 which is rotating in the direction shown by arrow 111. As seen in FIG. 2, each product filter rod 10a in the flow 5 is oriented with an end of the filter [from which the longitudinal channel (bore) extends] exposed, facing outwards from the flow.

In this example, the production line speed is 120 meters per minute (mpm), which means that the linear speed of the flute drum is 120/3=40 mpm, which translates to a speed of 8.82 revolutions per minute.

Fluted drum 9 has, around its periphery, a series of fifty-four lateral flutes or grooves 15 which extend across the width of fluted drum 9 in the same direction as the axis around which the fluted drum rotates. The longitudinal axis of each groove 15 is therefore oriented in the same direction as the longitudinal axis of the longitudinally extending core of each filter element 10a in the flow 5. As seen in FIG. 2, each groove is dimensioned so that it can accept a product filter rod 10a from the flow 5 and retain the rod 10a (e.g. by suction) as the fluted drum rotates in the direction of arrow 111 to transport the rods 10a for subsequent processing (for example to packaging, or for production of dual filter rods or filter cigarettes, not shown). Fluted drum 9 (and hopper 7) therefore provide an advancing flow of product filter rods 10a, wherein each rod 10a in the flow is oriented with the end of the rod 10a from which the longitudinal channel (bore) 12 extends exposed so it is facing outwards from the flow.

Figure 3:
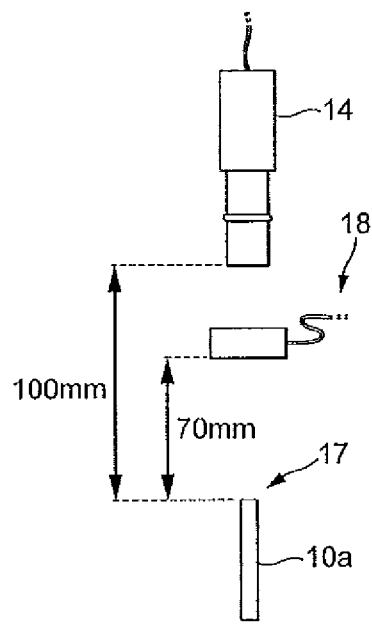
FIG. 3 shows a schematic view of part of the system of FIG. 2.

As best seen in FIG. 3, an image capture apparatus in the form of a camera 14 is oriented with its lens focussed on a position 17 past which the advancing flow of product filter rods 10a (with ends exposed) held in fluted drum 9 passes. The camera is a Keyence CV-200M CCD with a CA-LH50 Lens, with a shutter speed of ⅟₅₀₀, available from Keyence (GB).

A CA-DRBE LED light source 18 operating in flash mode illuminates position 17 to aid in picture resolution. The camera captures an image (a snapshot) of the exposed end of filter rod 10a in the advancing flow as it passes position 17 (see also FIG. 2). The camera 14 is able to capture (acquire) the image in approximately 29.2 ms, and is therefore able to capture images of each filter rod 10a in the flow in real time as they pass position 17, and pass these to an image analysis unit.

An analysis unit in the form of a computer [Controller CV-5501 with associated built in software available from Keyence (GB)] determines from the image of the exposed end of any given filter rod 10a (e.g. by comparison with a standard image) a value for one or more product control parameters, as set out below, and compares the (or each) determined value (for the parameter) with a predetermined value (for that parameter) to assess whether that filter rod 10a is acceptable. The CV-5501 unit has 19 inspection tools (Area, Pattern search, Stain, Edge width, Edge Pairs, Colour inspection, Geometry, Trend edge position, Trend edge width, Edge position, Edge Angle, Intensity, OCR, No. of Edge, Trend edge stain, Shape Trax II, Blobs, Pattern sort; and Edge pitch). The CD-5501 unit is set to progressive scan mode. The skilled person would readily appreciate how to utilise the settings to measure the appropriate parameter and compare this with a predetermined value.

In one embodiment, the analysis unit may determine a value for the position of the longitudinal channel in the exposed end of the filter rod 10*a*. This may be done by determining (from the Image) the centre point of the end of the filter rod 10*a*; and determining (from the image) the centre point of the longitudinal channel. These values may be given in terms of the pixels in the camera image which correspond to the centre points. The analysis unit may then determining a value for the distance between these centre points (e.g. in terms of pixels). If the determined value is too large (i.e. above the predetermined value for acceptable centering) this means the filter rod 10*a* is not acceptable because the channel is "off centre".

Figure 4A:
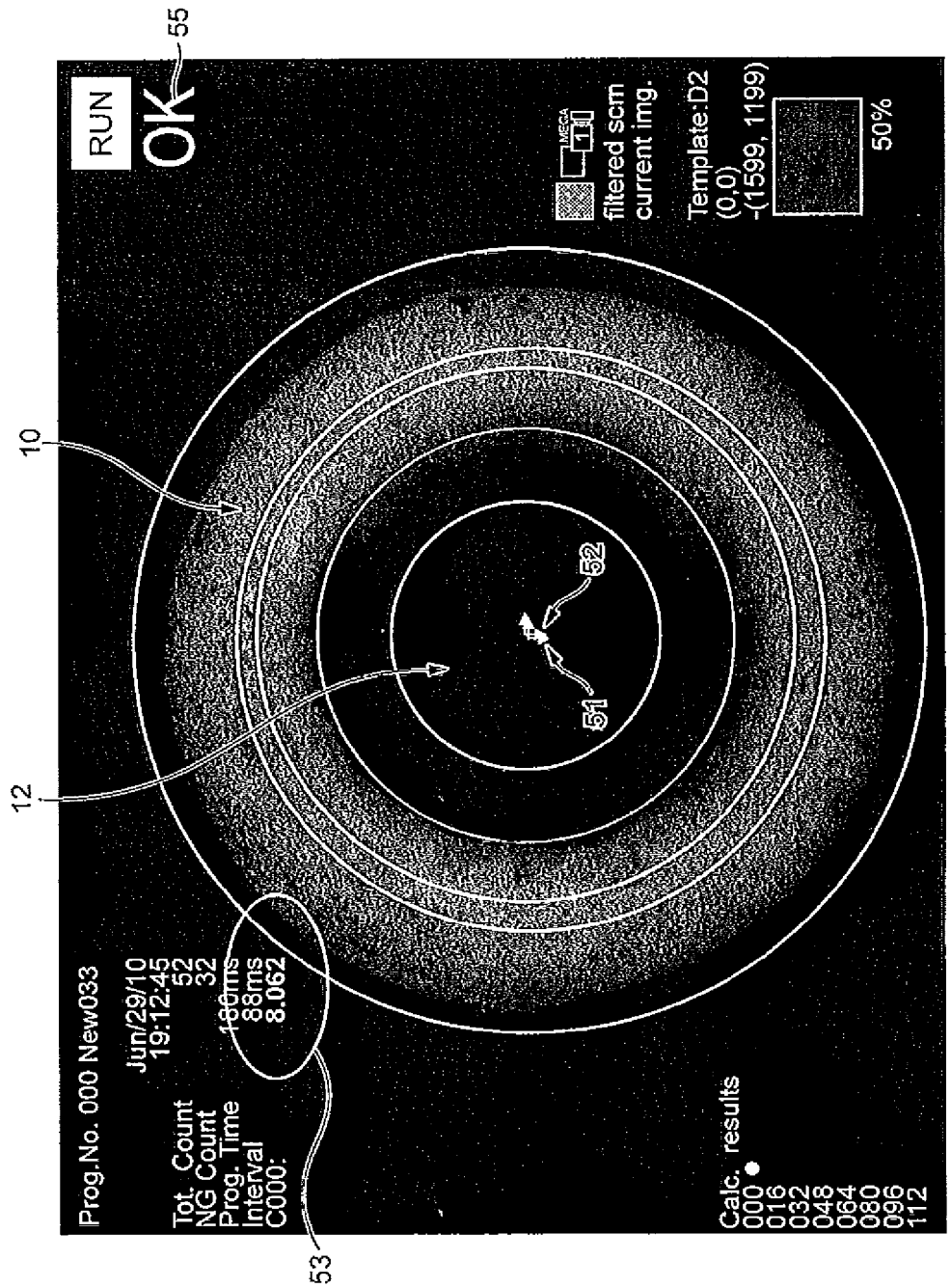
FIGS. 4A and 4B show, respectively, the output of the system of FIG. 2 for filters which have acceptable ("OK") and unacceptable ("NG") channel centering.
Figure 4B:
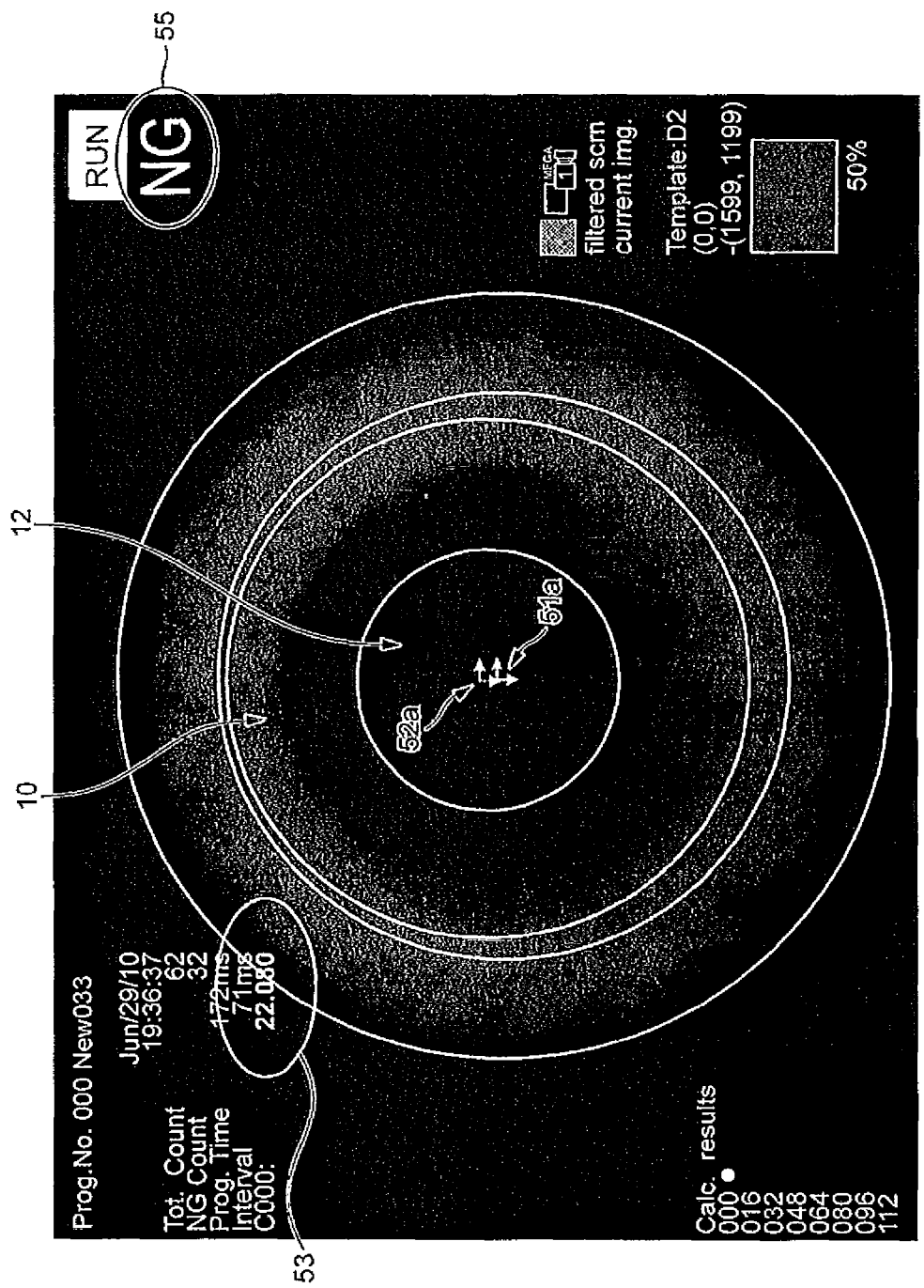

This is illustrated in more detail FIGS. 4A and 4B. In FIG. 4A the image shows the exposed end of the filter rod 10*a* with the longitudinally extending core of filtering material 10 defining the longitudinal channel or bore 12. The analysis unit determines (from the image) the pixel 51 corresponding to the centre point of the end of the filter rod 10*a*; and the pixel corresponding to the centre point 52 of the longitudinal channel. The analysis unit then determines the value for the distance between these centre points (e.g. in terms of pixels), which is shown in position 53. As the value (8.062 pixel as illustrated in FIG. 4A) is acceptable (below a predetermined value, e.g. 10, for an acceptable filter rod), then this means the channel is generally central within the core. A signal in position 55 ("OK") confirms that the filter rod 10 is acceptable.

In FIG. 4B the image shows the exposed end of the filter rod 10*a* with the longitudinally extending core of filtering material 10 defining the longitudinal channel or bore 12. The analysis unit determines (from the image) the pixel 51*a* corresponding to the centre point of the end of the filter rod 10*a*; and the pixel corresponding to the centre point 52*a* of the longitudinal channel. The analysis unit then determines the value for the distance between these centre points (e.g. in terms of pixels), which is shown in position 53. As the value (22.080 pixel as illustrated in FIG. 4B) is not acceptable (above the predetermined value, e.g. 10, for an acceptable filter rod), then this means the channel is not central within the core. A signal in position 55 ("NG") confirms that the filter rod 10*a* is not acceptable and should be rejected.

As seen above, the analysis unit may generate a signal (visual and/or audible) to the user to confirm whether any given filter rod 10*a* is acceptable or not. The system (and method) is sufficiently quick so as to provide the signal effectively real time, so the user can readily identify which rod 10*a* is not acceptable. The analysis unit may alternatively or additionally automatically reject unacceptable filters (e.g. before they are processed further). As set out above, the filter rod 10*a* is held in the fluted drum by suction or vacuum as it travels for further processing. The fluted drum may, as it revolves, pass a reject bin position (prior to the further processing location). The analysis unit may send a signal to either hold the filter rod 10*a* in place as it passes the reject bin (if the rod is acceptable) or remove the suction/vacuum, or reverse this to drop or blow a reject rod into the reject bin (if not acceptable). This ejector system is preferably accurate to one rod, filter or filter element, i.e. it is able to reject only the problematic rod by itself, unlike previous detection systems that will reject 3 rods before and after the actual problematic rod. The applicants have found that their system/method/apparatus finds sample rods quickly and accurately and it is therefore possible to reject only the problematic (unsatisfactory) rod, which greatly reduces waste compared with the prior systems.

The analysis unity may stop the production run if it determines a certain amount (proportion) of product filter rods, filters or filter elements are not acceptable.

The analysis unit may determine a value for the amount of material detectable within the cross sectional area of the longitudinal channel at the exposed end of the filter rod, filter or filter element and compare this with a predetermined value. If the determined value is too large (above the predetermined value) this means the filter rod, filter or filter element is not acceptable (e.g. because something—e.g. a "hair" or strand of filtering material is within the channel).

Figure 5:
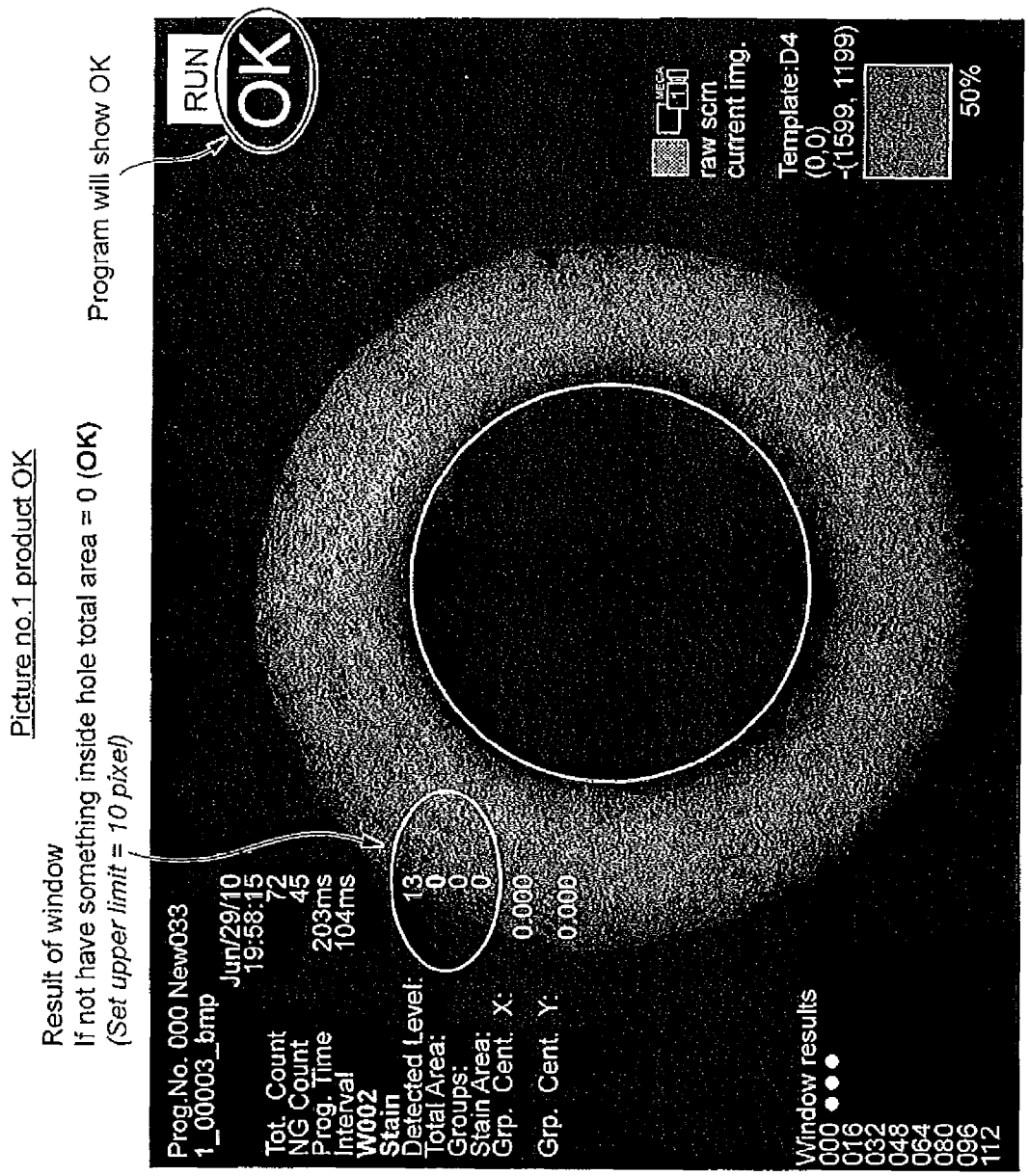
FIG. 5 shows the output of the system of FIG. 2 for filters which have acceptable ("OK") and unacceptable ("NG") channel definition.
Figure 5:
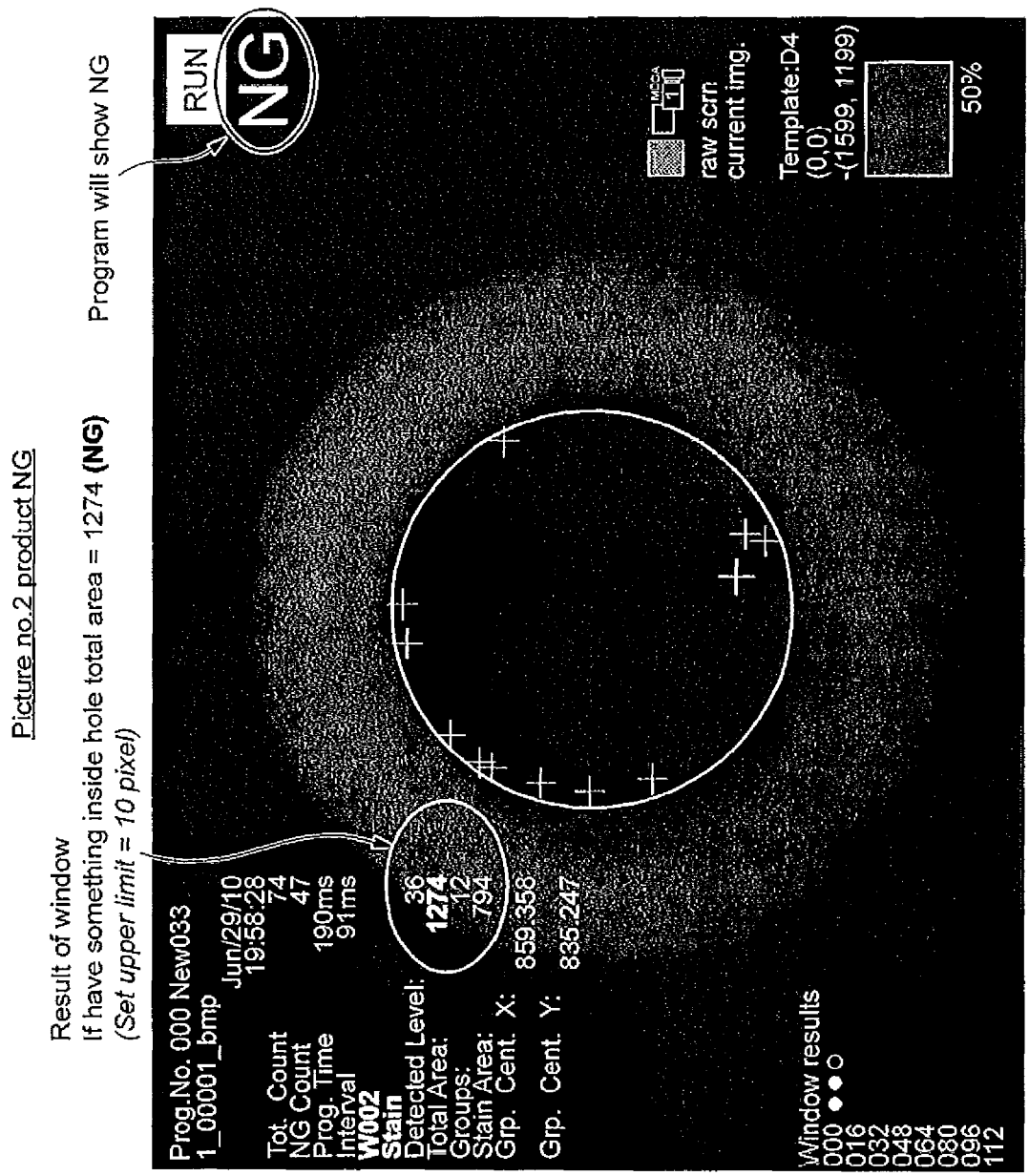

This is illustrated in more detail in FIG. 5. In FIG. 5 picture No. 1 the image shows the exposed end of the filter rod 10*a* with the longitudinally extending core of filtering material defining the longitudinal channel or bore (as for FIGS. 4A and 4B). The analysis unit compares the captured image with a stored image of a standard (i.e. acceptable) product rod, filter or filter element and determines, from the differences between the captured image and the image of the standard rod, filter or filter element, a value for the amount of material detectable within the cross sectional area of the longitudinal channel 12 at the exposed end of the filter rod. Thus the analysis unit analyses portions (e.g. pixels) of the captured image which are different compared to the stored image of the standard rod, filter or filter element; and determines a value(s) for the amount of material detectable within the cross sectional area of the longitudinal channel 12 based on portions (e.g. pixels) which are different when the two images are compared. The value corresponds to the number of pixels which show material detectable within the cross sectional area of the longitudinal channel 12. This is compared with a predetermined value, for example shown here, of 10. The determined/detected value (0 as illustrated in FIG. 5 picture No. 1) is acceptable (below the predetermined value for an acceptable filter rod) which means the channel is generally clear of obstruction. A signal in position 55 ("OK") indicates that the filter rod 10*a* is acceptable. The stored image of the standard rod is simply an image made of a particularly high quality rod, filter or filter element. The predetermined value is chosen so there is some tolerance to fluctuation in quality of the product rod, filter or filter elements, but so that all rods/filters or filter elements that are deemed acceptable (i.e. by comparing the detected/determined value with the predetermined value) are indeed suitable for their intended use (in e.g. filter cigarettes/subsequent processing etc).

In FIG. 5 picture No. 2 the image again shows the exposed end of the filter rod 10*a* with the longitudinally extending core of filtering material defining the longitudinal channel 12 or bore (as for FIGS. 4A and 4B). The analysis unit compares the captured image with a stored image of a standard (i.e. acceptable) product rod, filter or filter element and determines, from the differences between the captured image and the stored image of the standard rod, filter or filter element, a value for the amount of material detectable within the cross sectional area of the longitudinal channel 12 at the exposed end of the filter rod. Thus the analysis unit analyses portions (e.g. pixels) of the captured image which are different compared to the image of the standard rod, filter or filter element; and determines a value(s) for the amount of material detectable within the cross sectional area of the longitudinal channel 12 based on portions (e.g. pixels) which are different when the two images are compared. The value corresponds to the number of pixels which show material detectable within the cross sectional area of the longitudinal channel. This is compared with a predetermined value, for example shown here, of 10. The value (1274 as illustrated in FIG. 5 picture No. 2) is not acceptable (above the predetermined value for an acceptable filter rod) which means the channel 12 is not clear of obstruction. In this example it is clear that there are "hairs" or strands of filtering material and the channel is not well defined. A signal in position 55 ("NG") indicates that the filter rod 10a is not acceptable and should be rejected.

It will be appreciated that the analysis unit may, simultaneously with the test illustrated in FIG. 5, determine (from the differences between the captured image and the (e.g. stored) image of the standard rod, filter or filter element) a value for another parameter such as the outer perimeter (or shape) of the core. These values may be compared to predetermined values to assess whether the product is acceptable.

As set out the systems, methods and apparatuses of the Invention may be used to compare the captured image with a stored image of a standard rod, filter or filter element, and determine value(s) for the parameter(s) based (e.g. only) on portions (e.g. pixels) of the images which are different when the two images are compared; thus, the determination of the relevant parameter is based on analysis of a limited portion of the captured image (limited number of pixels), and is much quicker than the prior art processes. Further, the method may determine the relevant parameters (based on the image differences) simultaneously. These differences with the prior art mean that the applicants method may be used to analyse products at production line speeds of 100 to 150 meters per minute (mpm) as described above, or even higher production line speeds (e.g. product rods being made at speeds of 500 m/min).

Figure 6A:
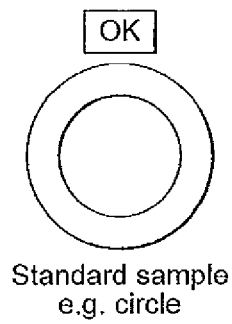
FIG. 6A shows the mouth end of filter elements (or filter rods) which are acceptable ("OK") as detected by the vision system and method of FIGS. 2 and 3, compared to filter elements (or filter rods) which are not acceptable ("NG") as detected by the vision system and method of FIGS. 2 and 3 (FIGS. 6 B to G).
Figure 6B:
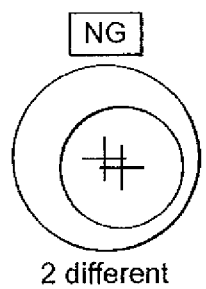
Figure 6C:
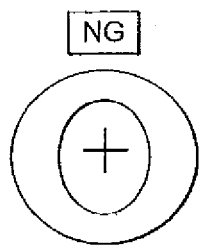
Figure 6D:
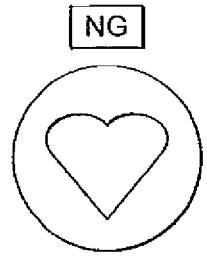

FIG. 6A shows the mouth end of filter elements (or filter rods) which are acceptable ("OK") as detected by the vision system and method of FIGS. 2 and 3, compared to filter elements (or filter rods) which are not acceptable ("NG") as detected by the vision system of FIGS. 2 and 3 (see FIGS. 6B to G).

Figure 6E:
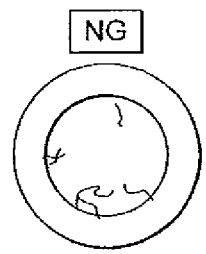
Figure 6F:
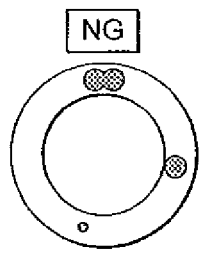
Figure 6G:
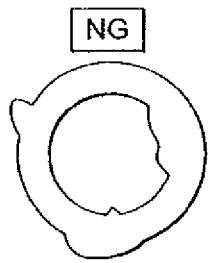

As shown, there are various ways in which a product may be unacceptable. The channel may be off centre (FIG. 6B), or the inside of the channel may be hairy (FIG. 6E). The system may be set to check these defects as set out above.

It will be appreciated by the skilled person that the system may be readily adapted to check other parameters such as: the cross sectional area of the longitudinal channel (bore) at the exposed end of the filter (i.e. check the shape and definition of channel for e.g. a hairy channel (FIG. 6E), a distorted circle (FIG. 6C), an incorrect shape (FIG. 6D), and a deformed shape (FIG. 6G); the outer perimeter of the longitudinal channel (bore) at the exposed end of the filter [I.e. check whether shape is correct (e.g. circular) or distorted such as FIG. 6 C, D, E or G]; the outer perimeter of the core (check if the whole filter is distorted such as FIG. 6G); the amount of material detectable outside the outer perimeter of the core at the exposed end (check if the whole filter is distorted such as FIG. 6G); the amount of impurity visible in the filtering material at the exposed end of the filter (check if there is contamination such as in FIG. 6F); the shape of the cross section of the longitudinal channel (bore) at the exposed end (to check whether an e.g., non-circular cross section channel conforms to the predetermined or preset shape; and the area of the exposed end (of the filter rod, filter or filter element) having a specific colour or pigment (check if pigment or colour is in the correct pattern, location or area); and compares the (or each) determined value (for the parameter) with a predetermined value (for that parameter) to assess whether the filter is acceptable.

The applicants have found that even at high speed production runs the system can capture images and detect all the defects shown in FIGS. 6B to 6G.

The applicants have found that the above system (CB-200M CCD camera, CA-LH50 lens and CA-DRBE LED) can capture the image, compare the captured image with a image of a standard rod (fitter or element), and assess from the differences between the captured image and the standard (e.g. by comparing the determined value with a predetermined value) whether the rod (filter or filter element) is acceptable in about 80 milliseconds (ms) or less. In other words, the above system may compare the determined value (for the captured image) with a predetermined value and thereby assess whether the rod, filter or element is acceptable within 90 milliseconds (ms) of commencement of step (b), capturing the image. The above system can capture an image and e.g. transfer this to the e.g. analysis unit in (approximately) 29.2 milliseconds. This allows real time image capture, assessment, and rejection of unacceptable product at normal production line speeds as are well known in the art (e.g. speeds of up to about 100 to 150 meters per minute (mpm), for example 120 mpm).

The present applicants have also found that their technique may be adapted for use at higher production line speeds (for example up to around 500 mpm), as follows. The apparatus is similar to that shown in FIG. 3, although the camera, lens, light etc. are of different specification, and the distances involved are slightly different. Thus, in a further example, in a similar manner to that shown in FIG. 3, an image capture apparatus in the form of a camera is oriented with its lens focussed on a position past which a flow of product filter rods held in a fluted drum is advanced. In this example, the production line speed is 500 meters per minute (mpm), which means that the linear speed of the flute drum is 500/3=166.66 mpm, which translates to a speed of 36.74 revolutions per minute. The filter rods in the advancing flow are held with an end exposed to (oriented towards) the camera (lens). The camera is a Keyence CV-H035M digital camera with a CA-LH16 (low distortion) lens, available from Keyence (GB). The shutter speed of the camera above is set to 1/20,000. The lens is distanced approximately 110 to 120 mm from the exposed ends of the filter rods held in the fluted drum, as the advancing flow of product filter rods in the drum passes the point on which the camera/lens is focussed.

A ring lamp LED illuminates the position on which the camera/lens is focussed, to aid in picture resolution. The ring lamp is positioned about 55 mm from the position on which the camera/lens is focussed. The camera captures an image (a snapshot) of the exposed end of the filter rod in the advancing flow as it passes the position on which the camera/lens is focussed, in a similar manner to that shown in FIG. 2 and FIG. 3 above.

In a further example, the position is illuminated by a Multilow Angle lighting system, which illuminates the position at an angle of 10 to 20 degrees (e.g. 15 degrees) to the target (rather than head on, or 90 degrees to the target). This angle reduces the reflection and may render the captured image clearer.

The analysis unit is in the form of a computer (Controller CV-5501 with associated built-in software available from Keyence (GB)). The analysis unit determines from the image of the exposed end of any given filter rod (e.g. by comparison with the standard image) a value for one or more product control parameters, as described above (see FIG. 5), and compares the (or each) determined value (for the parameter) with a predetermined value for that parameter (to assess whether the filter rod in the image is acceptable). The CD-5501 unit is set to interlace scan mode of duration 13.9 ms (rather than progressive scan, which has longer duration of 20.5 ms) by methods known in the art.

For high speed production runs (machine speeds of 500 m per minute or greater) the fluted drum rotates very quickly (36.74 rpm), and the system must take and process the image very quickly. The length of time for image capture (the time for the end of the filter rod in the advancing flow to pass the position on which the camera/lens is focussed) is 11 milliseconds (ms). The system must capture the image, compare the captured image with a image of a standard rod (filter or element), and assess from the differences between the captured image and the standard (e.g. by comparing the determined value with a predetermined value) whether the rod (filter or filter element) is acceptable in less than 36 milliseconds, so the rod, if unacceptable, can be rejected before it passes to the further stages of the production line.

The applicants have found that the above system can process the image in less than 36 milliseconds, which allows rods to be checked and rejected (if necessary) in less than 36 milliseconds, which in turn allows in line checking at production speeds of 500 m per minute or greater. In this example, the system may be set up to determine acceptability [from the differences between the captured image and the (e.g. stored) image of the standard rod, filter or filter element] for one or more of (for example all of) the following parameters:

(ii) the amount of (e.g. filtering) material detectable within the (e.g. cross sectional area) of the longitudinal channel (bore) at the exposed end (of the filter rod, filter or filter element) (e.g., rod hairiness);

(iv) the position of the longitudinal channel (bore) in the exposed end (of the filter rod, filter or filter element) (e.g., centering of the bore);

(vii) the amount of impurity visible in the filtering material at the exposed end (of the filter rod, filter or filter element) (e.g., dirtiness); and (xi) the diameter of the longitudinal channel (bore) in the exposed end (of the filter rod, filter or filter element).

The invention claimed is:

1. A system for assessing the acceptability of product filter rods, filters or filter elements which comprise a longitudinally extending core of filtering material including a longitudinal channel extending from an end of the core;
the system comprising:
(a) means for advancing a flow of product filter rods, filters or filter elements such that each filter rod, filter or filter element in the flow is oriented with the end of the filter rod, filter or filter element from which the longitudinal channel extends exposed;
(b) means for capturing an image of an exposed end of a filter rod, filter or filter element in the advancing flow;
(c) means for comparing the captured image with a stored image of a standard rod, filter or filter element;
(d) means which determines, from differences between the captured image and the stored image of the standard rod, filter or filter element, a value for one or more of:
(i) the cross sectional area of the longitudinal channel at the exposed end of the filter rod, filter or filter element;
(ii) an amount of material detectable within the longitudinal channel at the exposed end of the filter rod, filter or filter element;
(iii) the outer perimeter of the longitudinal channel at the exposed end of the filter rod, filter or filter element;
(iv) the position of the longitudinal channel in the exposed end of the filter rod, filter or filter element;
(v) the outer perimeter of the core;
(vi) an amount of material detectable outside the outer perimeter of the core at the exposed end of the filter rod, filter or filter element;
(vii) an amount of impurity visible in the filtering material at the exposed end of the filter rod, filter or filter element;
(viii) the shape of the cross section of the longitudinal channel at the exposed end of the filter rod, filter or filter element;
(ix) the area of the exposed end of the filter rod, filter or filter element having a specific colour or pigment;
(x) the diameter of the exposed end of the filter rod, filter or filter element; and
(xi) the diameter of the longitudinal channel in the exposed end of the filter rod, filter or filter element;
and compares the or each determined value with a predetermined value to thereby assess whether the filter rod, filter or filter element is acceptable, wherein the value is or values are determined based on portions of the captured image which are different when the captured image is compared to the stored image of the standard rod, filter or filter element.

2. A system according to claim 1 in which values for two or more parameters are determined simultaneously.

3. A system according to claim 1 further comprising means for removing a filter rod, filter or filter element which is assessed to be not acceptable from the advancing flow.

4. A system according to claim 1 wherein the means for advancing a flow of product filter rods, filters or filter elements comprises a fluted wheel which includes a plurality of grooves or flutes in its perimeter, each of which are dimensioned to engage with a single product filter rod, filter or filter element.

5. A system according to claim 4 wherein the grooves or flutes include suction means to hold the single product filter rod, filter or filter element in place while the means for capturing an image captures the image of the exposed end of the filter rod, filter or filter element in the advancing flow.

6. A system according to claim 4 wherein the fluted wheel includes means for ejecting the filter rod, filter or filter element from the advancing flow in the event it is unacceptable.

7. A system according to claim 1 wherein an analysis unit determines a value for the position of the longitudinal channel in the exposed end of the filter rod, filter or filter element by: determining a centre point of the end of the filter rod, filter or filter element from which the longitudinal channel extends; determining a centre point of the longitudinal channel; determining a value for a distance between these centre points; and comparing the value for the distance between the centre points with a predetermined value.

8. A system according to claim 7 wherein the analysis unit determines a value for the amount of material detectable within the cross sectional area of the longitudinal channel at the exposed end of the filter rod, filter or filter element and compares this value with a predetermined value.

9. A system according to claim 7 wherein the analysis unit determines a value for the amount of impurity visible in the filtering material at the exposed end of the filter rod, filter or filter element and compares this value with a predetermined value.

10. A system according to claim 7 wherein the analysis unit determines a value for the amount of material detectable within the cross sectional area of the longitudinal channel at the exposed end of the filter rod, filter or filter element by determining the cross sectional area of the longitudinal channel and comparing this cross sectional area with a predetermined value.

11. A system according to claim 1 wherein the longitudinally extending core includes one or more channels.

12. A system according to claim 11 wherein the longitudinal channel has a circular, triangular, star shaped, cog shaped or heart shaped cross section oriented perpendicular to its longitudinal axis.

13. A machine for production of filter rods, filters or filter elements, the machine comprising a system according to claim 1.

14. A method for assessing the acceptability of product filter rods, filters or filter elements which comprise a longitudinally extending core of filtering material including a longitudinal channel extending from an end of the core;
the method comprising the steps of:
(a) advancing a flow of product filter rods, filters or filter elements such that each filter rod, filter or filter element in the flow is oriented with the end from which the longitudinal channel extends exposed;
(b) capturing an image of an exposed end of a filter rod, filter or filter element in the advancing flow;
(c) comparing the captured image with a stored image of a standard rod, filter or filter element;
(d) determining, from differences between the captured image and the stored image of the standard rod, filter or filter element, a value for one or more of the following parameters:
  (i) the cross sectional area of the longitudinal channel at the exposed end of the filter rod, filter or filter element;
  (ii) an amount of material detectable at the exposed end of the filter rod, filter or filter element;
  (iii) the outer perimeter of the longitudinal channel at the exposed end of the filter rod, filter or filter element;
  (iv) the position of the longitudinal channel in the exposed end of the filter rod, filter or filter element;
  (v) the outer perimeter of the core;
  (vi) an amount of material detectable outside the outer perimeter of the core at the exposed end of the filter rod, filter or filter element; and
  (vii) an amount of impurity visible in the filtering material at the exposed end of the filter rod, filter or filter element;
  (viii) the shape of the cross section of the longitudinal channel at the exposed end of the filter rod, filter or filter element;
  (ix) the area of the exposed end of the filter rod, filter or filter element having a specific colour or pigment;
  (x) the diameter of the exposed end of the filter rod, filter or filter element; and
  (xi) the diameter of the longitudinal channel in the exposed end of the filter rod, filter or filter element;
(e) comparing the or each determined value with a predetermined value to thereby assess whether the filter rod, filter or filter element is acceptable, wherein the value is or values are determined based on portions of the captured image which are different when the captured image is compared to the stored image of the standard rod, filter or filter element.

15. A method according to claim 14 comprising a step of determining a value for the position of the longitudinal channel in the exposed end of the filter rod, filter or filter element by: determining a centre point of the end of the filter rod, filter or filter element from which the longitudinal channel extends; determining a centre point of the longitudinal channel; and determining a value for a distance between these centre points.

16. A method according to claim 14 comprising steps of determining a value for the amount of material detectable within the cross sectional area of the longitudinal channel at the exposed end of the filter rod, filter or filter element by determining the cross sectional area of the longitudinal channel and comparing this cross sectional area with a predetermined value; or comprising steps of determining a value of material detectable within the cross sectional area of the longitudinal channel at the exposed end of the filter rod, filter or filter element and comparing this value with a predetermined value.

17. A method according to claim 14 comprising steps of determining a value for the amount of impurity visible in the filtering material at the exposed end of the filter rod, filter or filter element and comparing this value with a predetermined value.

18. A method according to claim 14 in which the image of the exposed end of a filter rod, filter or filter element in the advancing flow is captured over a period of 5 to 35 milliseconds (ms); and/or in which the step of comparing the or each determined value with a predetermined value to thereby assess whether the rod, filter or element is acceptable is completed within 90 milliseconds (ms) of commencement of step (b).

19. A method according to claim 14 in which steps (d) and (e) determine, from the differences between the captured image and the stored image of the standard rod, filter or filter element, a value for one or more of the following parameters:
  (ii) the amount of material detectable within the longitudinal channel at the exposed end of the filter rod, filter or filter element;
  (iv) the position of the longitudinal channel in the exposed end of the filter rod, filter or filter element;
  (vii) the amount of impurity visible in the filtering material at the exposed end of the filter rod, filter or filter element; and
  (xi) the diameter of the longitudinal channel in the exposed end of the filter rod, filter or filter element;
and compare the or each determined value or all determined values with a predetermined value and thereby assess whether the rod, filter or element is acceptable within 40 milliseconds (ms) of commencement of step (b).

20. A method according to claim 19 wherein the or each determined value or all determined values are compared with a predetermined value to thereby assess whether the rod, filter or element is acceptable within 36 milliseconds (ms) of commencement of step (b).

21. A method according to claim 14 in which values for two or more parameters are determined simultaneously.

22. A method according to claim 14 further comprising a step of signalling if the filter rod, filter or filter element is not acceptable; and/or further comprising a step of removing a filter rod, filter or filter element which is not acceptable from the advancing flow; and/or further comprising a step of halting production of product filter rods, filters or filter elements in the event a predetermined proportion of product filter rods, filters or filter elements are not acceptable.

* * * * *